(12) United States Patent
Hansen (10) Patent No.: US 10,948,452 B2
(45) Date of Patent: Mar. 16, 2021

(54) SENSING ELECTRODE OXYGEN CONTROL IN AN OXYGEN SENSOR

(71) Applicant: Honeywell International Inc., Morris Plains, NJ (US)

(72) Inventor: Neils Hansen, Poole (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 425 days.

(21) Appl. No.: 15/754,268

(22) PCT Filed: Aug. 24, 2015

(86) PCT No.: PCT/US2015/046461
§ 371 (c)(1),
(2) Date: Feb. 21, 2018

(87) PCT Pub. No.: WO2017/034535
PCT Pub. Date: Mar. 2, 2017

(65) Prior Publication Data
US 2018/0266981 A1  Sep. 20, 2018

(51) Int. Cl.
*G01N 27/409* (2006.01)
*G01N 27/404* (2006.01)
*G01N 27/407* (2006.01)

(52) U.S. Cl.
CPC ......... *G01N 27/409* (2013.01); *G01N 27/404* (2013.01); *G01N 27/4075* (2013.01)

(58) Field of Classification Search
CPC . G01N 27/409; G01N 27/404; G01N 27/4075
See application file for complete search history.

(56) References Cited

U.S. PATENT DOCUMENTS

| | | |
|---|---|---|
| 3,629,936 A | 12/1971 | Harnoncourt |
| 3,785,948 A | 1/1974 | Hitchman et al. |
| 4,322,278 A | 3/1982 | Cromer |
| 4,329,214 A | 5/1982 | Spritzer et al. |
| 4,406,770 A | 9/1983 | Chan et al. |
| 4,428,817 A | 1/1984 | Isenberg |

(Continued)

FOREIGN PATENT DOCUMENTS

| | | |
|---|---|---|
| CN | 1867825 A | 11/2006 |
| CN | 102027359 A | 4/2011 |

(Continued)

OTHER PUBLICATIONS

PCT Application No. PCT/US2015/046461, International Search Report, dated Apr. 29, 2016, 3 pages.

(Continued)

*Primary Examiner* — Maris R Kessel
(74) *Attorney, Agent, or Firm* — Alston & Bird LLP (57) ABSTRACT

An oxygen sensor comprises a housing defining an interior space, a sensing electrode, a reference electrode, a counter electrode, a separator retaining an electrolyte, and a chamber within the housing. The retained electrolyte provides ionically conductive pathways between each of the sensing electrode, the reference electrode, and the counter electrode within the housing, and the chamber contains the sensing electrode. The chamber comprises an opening, and the separator extends into the chamber and substantially fills the opening.

10 Claims, 2 Drawing Sheets

(56) References Cited

U.S. PATENT DOCUMENTS

| | | | |
|---|---|---|---|
| 4,605,604 | A | 8/1986 | Pollack et al. |
| 4,695,361 | A | 9/1987 | Grady |
| 5,338,429 | A | 8/1994 | Jolson et al. |
| 5,723,036 | A | 3/1998 | Chrzan et al. |
| 5,865,973 | A | 2/1999 | Kiesele et al. |
| 5,914,019 | A | 6/1999 | Dodgson et al. |
| 5,932,079 | A | 8/1999 | Haupt et al. |
| 6,248,224 | B1 | 6/2001 | Kitzelmann |
| 6,376,124 | B1 * | 4/2002 | Dodgson ............ B01J 19/0093 429/127 |
| 6,454,923 | B1 | 9/2002 | Dodgson et al. |
| 6,666,963 | B1 | 12/2003 | Peng et al. |
| 7,022,213 | B1 | 4/2006 | Austen et al. |
| 7,077,938 | B1 | 7/2006 | Austen et al. |
| 7,935,234 | B2 | 5/2011 | Mett |
| 8,083,914 | B2 | 12/2011 | Millar et al. |
| 8,163,165 | B2 | 4/2012 | Offenbacher et al. |
| 8,632,665 | B2 | 1/2014 | Eckhardt et al. |
| 8,840,765 | B2 | 9/2014 | Offenbacher |
| 2003/0150725 | A1 | 8/2003 | Tschuncky |
| 2005/0034987 | A1 | 2/2005 | Zhou et al. |
| 2006/0021873 | A1 * | 2/2006 | Mett .................. G01N 27/404 204/424 |
| 2006/0266647 | A1 | 11/2006 | Khalafpour et al. |
| 2008/0202929 | A1 | 8/2008 | Chapples et al. |
| 2009/0288962 | A1 | 11/2009 | Yantasee et al. |
| 2010/0170795 | A1 | 7/2010 | Cowburn et al. |
| 2011/0100811 | A1 | 5/2011 | Eckhardt et al. |
| 2011/0100814 | A1 | 5/2011 | Brown et al. |
| 2014/0311905 | A1 | 10/2014 | Stetter et al. |
| 2015/0241382 | A1 | 8/2015 | Mett et al. |
| 2018/0143157 | A1 | 5/2018 | Hansen |
| 2018/0143158 | A1 | 5/2018 | Harris |
| 2018/0149614 | A1 | 5/2018 | Harris et al. |
| 2018/0149615 | A1 | 5/2018 | Spong et al. |
| 2018/0149616 | A1 | 5/2018 | Hansen |

FOREIGN PATENT DOCUMENTS

| | | |
|---|---|---|
| CN | 102818831 A | 12/2012 |
| CN | 108027336 A | 5/2018 |
| CN | 108027337 A | 5/2018 |
| CN | 108027338 A | 5/2018 |
| CN | 108027339 A | 5/2018 |
| CN | 108027340 A | 5/2018 |
| CN | 108139352 A | 6/2018 |
| EP | 0763730 A1 | 3/1997 |
| EP | 0780686 A1 | 6/1997 |
| EP | 1688736 A1 | 8/2006 |
| EP | 1832873 A1 | 9/2007 |
| EP | 3325953 A1 | 5/2018 |
| EP | 3325954 A1 | 5/2018 |
| EP | 3325955 A1 | 5/2018 |
| EP | 3325956 A1 | 5/2018 |
| EP | 3325957 A1 | 5/2018 |
| EP | 3341717 A1 | 7/2018 |
| GB | 2094005 A | 9/1982 |
| GB | 2332528 A | 6/1999 |
| GB | 2371873 A | 8/2002 |
| WO | 96/14576 A1 | 5/1996 |
| WO | 0114864 A2 | 3/2001 |
| WO | 0114868 A2 | 3/2001 |
| WO | 0131326 A1 | 5/2001 |
| WO | 02073177 A2 | 9/2002 |
| WO | 2007115801 A1 | 10/2007 |
| WO | 2009138357 A1 | 11/2009 |
| WO | 2017014764 A1 | 1/2017 |
| WO | 2017014850 A1 | 1/2017 |
| WO | 2017014851 A1 | 1/2017 |
| WO | 2017014852 A1 | 1/2017 |
| WO | 2017014853 A1 | 1/2017 |
| WO | 2017014854 A1 | 1/2017 |
| WO | 2017034535 A1 | 3/2017 |

OTHER PUBLICATIONS

PCT Application No. PCT/US2015/046461, Written Opinion of the International Searching Authority, dated Apr. 29, 2016, 8 pages.
PCT Application No. PCT/US2015/046461, International Preliminary Report on Patentability, dated Mar. 8, 2018, 10 pages.
International Application No. PCT/US2015/041449, International Search Report, dated Mar. 24, 2016, 4 pages.
International Application No. PCT/US2015/041449, Written Opinion of the International Searching Authority, dated Mar. 24, 2016, 9 pages.
International Application No. PCT/US2016/036727, International Search Report, dated Aug. 22, 2016, 5 pages.
International Application No. PCT/US2016/036727, Written Opinion of the International Searching Authority, dated Aug. 22, 2016, 7 pages.
International Application No. PCT/US2016/036637, International Search Report, dated Aug. 22, 2016, 5 pages.
International Application No. PCT/US2016/036637, Written Opinion of the International Searching Authority, dated Aug. 22, 2016, 6 pages.
International Application No. PCT/US2016/036609, International Search Report, dated Aug. 25, 2016, 5 pages.
International Application No. PCT/US2016/036609, Written Opinion of the International Searching Authority, dated Aug. 25, 2016, 7 pages.
International Application No. PCT/US2016/036660, International Search Report, dated Aug. 22, 2016, 5 pages.
International Application No. PCT/US2016/036660, Written Opinion of the International Searching Authority, dated Aug. 22, 2016, 7 pages.
International Application No. PCT/US2016/036684, International Search Report, dated Aug. 10, 2016, 4 pages.
International Application No. PCT/US2016/036684, Written Opinion of the International Searching Authority, dated Aug. 10, 2016, 7 pages.
International Application No. PCT/US2015/041449, International Preliminary Report on Patentability, dated Jan. 23, 2018, 10 pages.
International Application No. PCT/US2016/036727, International Preliminary Report on Patentability, dated Jan. 23, 2018, 8 pages.
International Application No. PCT/US2016/036609, International Preliminary Report on Patentability, dated Jan. 23, 2018, 8 pages.
International Application No. PCT/US2016/036637, International Preliminary Report on Patentability, dated Jan. 23, 2018, 7 pages.
International Application No. PCT/US2016/036660, International Preliminary Report on Patentability, dated Jan. 23, 2018, 8 pages.
International Application No. PCT/US2016/036684, International Preliminary Report on Patentability, dated Jan. 23, 2018, 8 pages.
Europe Application No. 16732827.7, Communication pursuant to Rule 161(1) and 162 EPC, dated Mar. 1, 2018, 3 pages.
Europe Application No. 16732818.6, Communication pursuant to Rule 161(1) and 162 EPC, dated Mar. 1, 2018, 3 pages.
Europe Application No. 16732107.4, Communication pursuant to Rule 161(1) and 162 EPC, dated Mar. 1, 2018, 3 pages.
Europe Application No. 16732822.8, Communication pursuant to Rule 161(1) and 162 EPC, dated Mar. 1, 2018, 3 pages.
CityTech.com, "4OxLL Technology", Oct. 22, 2017, [online], [retreived Oct. 13, 2020], retreived from Internet Archive <URL https://web.archive.org/web/2017*/%20http://www.gas-sensors.co.uk/4oxll-launch-site/technology.html> (2 pages).
CN Notice of Allowance dated Apr. 30, 2020 for CN Application No. 201580084074.
CN Office Action dated Sep. 23, 2019 for CN Application No. 201580084074.
CN Search report dated Sep. 12, 2019 for CN Application No. 201580084074.
Communication from the Examining Division pursuant to Rules 70(2) and 70a(2) EPC dated Jun. 17, 2019 for EP Application No. 15902407.
English Translation of CN Notice of Allowance dated Apr. 30, 2020 for CN Application No. 201580084074.
English Translation of CN Office Action dated Sep. 23, 2019 for CN Application No. 201580084074.

(56) References Cited

OTHER PUBLICATIONS

European search opinion dated May 29, 2019 for EP Application No. 15902407.
Supplementary European search report dated May 29, 2019 for EP Application No. 15902407.

* cited by examiner

FIG. 1

FIG. 2

SENSING ELECTRODE OXYGEN CONTROL IN AN OXYGEN SENSOR

CROSS-REFERENCE TO RELATED APPLICATIONS

The present application claims priority to and is the National Stage of International Application No. PCT/US2015/046461 (entitled SENSING ELECTRODE OXYGEN CONTROL IN AN OXYGEN SENSOR filed Aug. 24, 2015), which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Oxygen sensors can be used to detect the concentration of oxygen in an environment adjacent to the sensor over a range of environmental conditions. When the sensor operates at a certain temperature, a concentration of oxygen can be dissolved in the electrolyte within the sensor. As the temperature increases, the solubility of most gases, including oxygen and nitrogen, can decrease and result in the formation of bubbles of the gas or gases. In an oxygen sensor, these small bubbles of air containing a mixture of nitrogen and oxygen may diffuse to the sensing electrode and react by a process of electrochemical reduction at the catalyst surface, resulting in an artificially high oxygen reading as the finite volume of oxygen gas is consumed at the sensing electrode. Due the transient nature of this response, this type of failure may be referred to as a "spiking" failure.

SUMMARY

In an embodiment, an oxygen sensor comprises a housing defining an interior space, a sensing electrode, a reference electrode, a counter electrode, a separator retaining an electrolyte, and a chamber within the housing. The separator is in intimate contact with each of the sensing electrode, the reference electrode, and the counter electrode within the housing, the retained electrolyte enabling ionic conduction between all electrodes, and the chamber contains the sensing electrode. The chamber comprises an opening, and the separator extends into the chamber and substantially fills the opening.

In an embodiment, an oxygen sensor comprises a housing defining an interior space, a sensing electrode, a reference electrode, a counter electrode, and a separator retaining an electrolyte. The sensing electrode, the reference electrode, and the counter electrode are disposed in a planar arrangement, and the electrolyte in the separator which can comprise of a porous, non-woven mat of fibers (e.g., electrically insulating glass fibers), is in intimate contact with each of the sensing electrode, the reference electrode, and the counter electrode within the housing. The electrolyte retained within the porous separator forms a single, planar ionically conductive pathway, and each of the sensing electrode, the reference electrode, and the counter electrode are disposed on the single, planar ionically conductive pathway.

In an embodiment, a method of detecting oxygen comprises receiving oxygen within a housing of an oxygen sensor that comprises a sensing electrode, a counter electrode, and a reference electrode, contacting the oxygen with a separator retaining an electrolyte, forming an oxygen concentration gradient in the electrolyte in the separator between the sensing electrode and the counter electrode, limiting an oxygen concentration along the oxygen gradient near the sensing electrode to less than a threshold amount, and detecting a current between the sensing electrode and the counter electrode, wherein the current is proportional to a concentration of the oxygen. The separator is in contact with each of the sensing electrode, the counter electrode, and the reference electrode, and the separator forms a planar ionic conduction pathway between the sensing electrode, the counter electrode, and the reference electrode.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The oxygen sensor described herein relies upon the principle of an oxygen pump. In this type of sensor, oxygen is reduced at the sensing electrode and water is oxidized at the counter electrode according to the following half reactions:

At the sensing electrode: $O_2+4H^++4e^-\rightarrow 2H_2O$ (Eq. 1)

At the counter electrode: $2H_2O\rightarrow O_2+4H^++4e^-$ (Eq. 2)

The overall reaction results in the consumption of oxygen at the sensing electrode with an equivalent production of oxygen at the counter electrode. The overall reaction is maintained by means of a reference electrode and a potentiostat, which lower the potential at the sensing electrode and allow the reaction to proceed. The resulting current between the sensing electrode and the counter electrode is proportional to the oxygen concentration of the ambient gas. In contrast to others sensors, there is no consuming reaction in which the electrodes themselves are consumed.

The result of the reactions at each electrode is an oxygen concentration gradient in the electrolyte. The concentration of the dissolved oxygen in the electrolyte varies with the composition of the electrolyte, the temperature of the electrolyte, the atmospheric pressure, and the position relative to the sensing electrode and the counter electrode. The oxygen concentration at or near the sensing electrode may be around 0%, while the oxygen concentration in the electrolyte at or near the counter electrode may correspond to a concentration close to or above the ambient gas concentration. Within this gradient, the dissolved oxygen and/or nitrogen concentration may exceed a saturated concentration due to a temperature rise. As the temperature rises above the saturation concentration, a gas phase comprising oxygen can form, and the resulting gas phase bubbles can travel to the sensing electrode where they may react. The resulting spike in the concentration value can result in a false alarm.

In order to control the oxygen concentration in the electrolyte surrounding the sensing electrode, the air/electrolyte interface can be controlled so that the closest interface is positioned a suitable distance away from the sensing electrode. Specifically, a low oxygen zone can be created around the sensing electrode that is substantially sealed off from the air/electrolyte interface. This zone may limit the oxygen introduction to the sensing electrode to that occurring through the wetted separator. In order to control the inlet oxygen diffusion rate, the relative geometric parameters of the separator can be adjusted along with the relative distances between the sensing electrode, the reference electrode, and the counter electrode so that a flux of the oxygen to the sensing electrode is controlled. This may provide an oxygen sensor having an improved resistance to spiking failures across a broad range of temperatures. In some embodiments, a sealed area around the sensing electrode can be used to limit the amount of oxygen reaching the sensing electrode to a diffusional flow. The sealed area may limit or prevent oxygen in a gas from contacting the separator adjacent to the sensing electrode, which may help to avoid any spiking failures.

Figure 1:
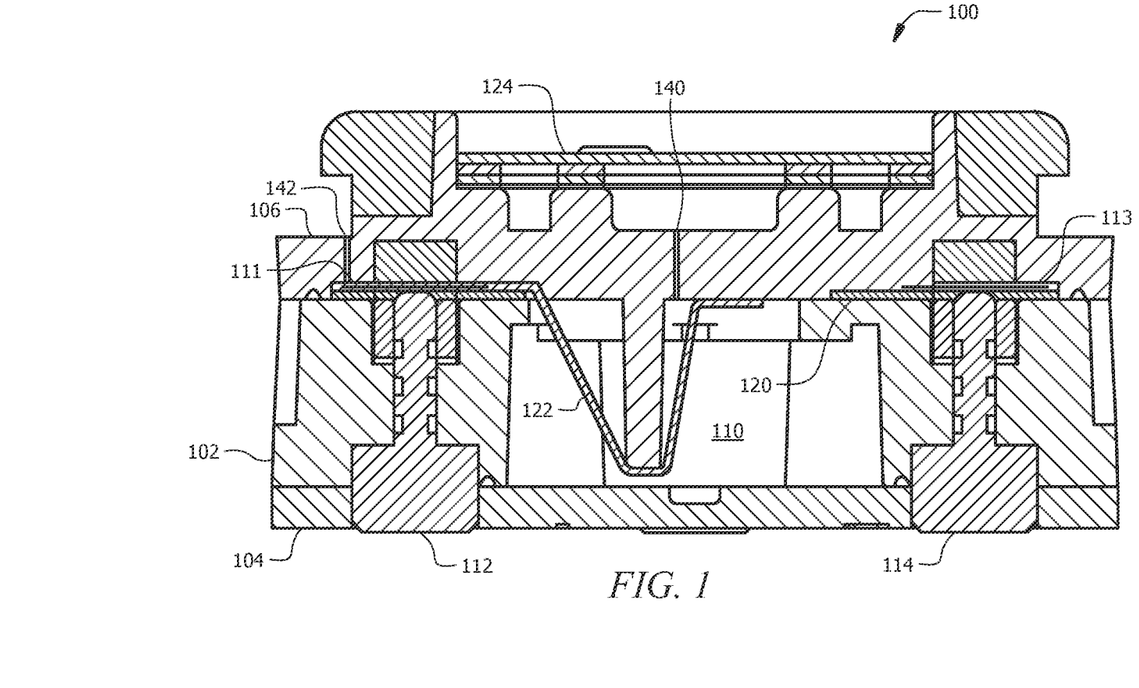
FIG. 1 illustrates a schematic cross section of an embodiment of an electrochemical gas sensor according to an embodiment.
Figure 2:
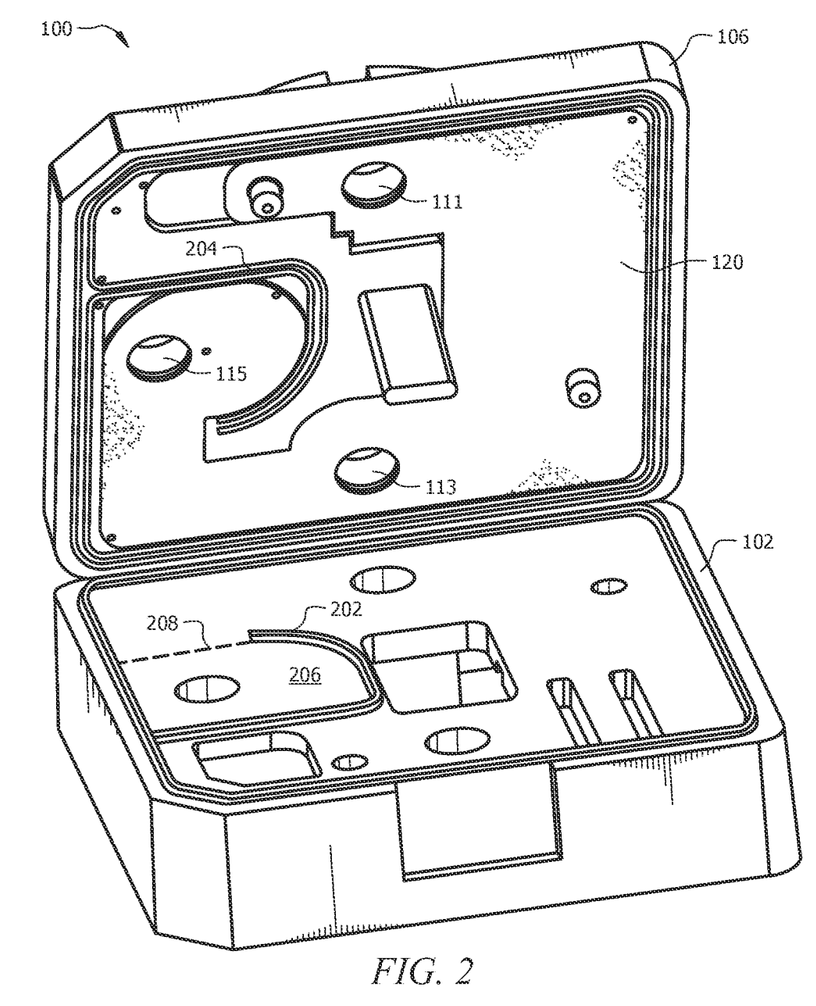
FIG. 2 illustrates an isometric view of the oxygen sensor according to an embodiment.

FIG. 1 illustrates a cross-section of an embodiment of an oxygen sensor 100, and FIG. 2 illustrates an isometric view of the oxygen sensor of FIG. 1 with the layout of the separator and electrodes illustrated. The oxygen sensor 100 can comprise a multi-part housing including at least a body 102 defining a hollow interior space 110 for receiving and retaining an electrolyte (e.g., forming an electrolyte reservoir), a base 104, and a cap 106. The base 104 and the cap 106 can sealingly engage the body 102 to form an integral unit.

The body 102 may have a generally rectangular or square shape, though other shapes such as cylindrical, oval, oblong, or the like are also possible. The body 102, the cap 106, and the base 104 can all be formed from materials that are inert to the selected electrolyte. For example, the body 102, the cap 106, and/or the base 104 can be formed from one or more plastic or polymeric materials. In an embodiment, the body 102, the cap 106, and/or the base 104 can be formed from a material including, but not limited to, acrylonitrile butadiene styrene (ABS), polyphenylene oxide (PPO), polystyrene (PS), polypropylene (PP), polyethylene (PE) (e.g., high density polyethylene (HDPE)), polyphenylene ether (PPE), or any combination or blend thereof.

One or more openings can be formed through the body to allow the ambient gas to enter the interior space 110 and/or allow any gases generated within the housing to escape. In an embodiment, the oxygen sensor 100 may comprise at least one inlet opening 140 to allow the ambient gas to enter the housing, and at least one exhaust opening 142 to allow the oxygen generated by the counter electrode 111 to exhaust from the housing. The inlet opening 140 and/or the exhaust opening 142 can be disposed in the cap 106 when a cap is present and/or in a wall of the body 102. The inlet opening 140 and/or the exhaust opening 142 can comprise a diffusion barrier to restrict the flow of gas (e.g., oxygen) to the sensing electrode 115. The diffusion barrier can be created by forming the inlet opening 140 and/or the exhaust opening 142 as a capillary and/or a film or membrane can be used to control the mass flow rate through one or more of the openings 140, 142.

In an embodiment, the inlet opening 140 and/or the exhaust opening 142 may serve as capillary openings to provide a rate limited exchange of the gases between the interior and exterior of the housing. In an embodiment, the inlet opening 140 may have a diameter between about 20 μm and about 200 μm, where the opening can be formed using a convention drill for larger openings and a laser drill for smaller openings. The inlet opening 140 may have a length between about 0.5 mm and about 5 mm, depending on the thickness of the cap 106. The exhaust opening 142 may have a diameter and length in the same ranges as the inlet opening 140. In some embodiments, two or more openings may be present for the inlet gases and/or the exhaust gases. When a membrane is used to control the gas flow into and/or out of the housing, the opening diameter may be larger than the sizes listed above as the film can contribute to and/or may be responsible for controlling the flow rate of the gases into and out of the housing.

A porous membrane 122 can also be disposed within the sensor 100, a portion of which can serve as a vent membrane to allow any gas forming within the sensor to pass through the membrane and out the exhaust opening 142 in the cap 106 to the atmosphere and/or to control the flow of the ambient gases into the housing through the inlet opening 140. The membrane 122 may be porous to a gas, but can generally form a barrier to the passage of any liquids such as the electrolyte solution in order to form a liquid seal relative to the outside environment. In an embodiment, the porous membrane 122 can be formed from polytetrafluoroethylene (PTFE), fluorinated ethylene propylene (FEP), polyethylene (PE), polypropylene (PP), polymethyl methacrylate (PMMA), polyethylene terephthalate (PET) polyaryletheretherketone (PEEK), perfluoroalkoxy (PFA), ethylene chlorotrifluoroethylene (E-CTFE), and any combination thereof. The porous membrane 122 can cover the inlet opening 140 and/or the exhaust opening 142. The flow rate of the gas can then be controlled by the relative permeability of the porous membrane 122 to selected gases.

A higher density, lower porosity bulk flow membrane 124 can be disposed within the cap 106 to serve as a barrier to the bulk flow of gases into the sensor 100, which can impart tolerance to local environmental pressure changes. The opening 140 through the cap 106 and/or the bulk flow membrane may provide a restrictive and/or tortuous diffusional path to allow the gases in the atmosphere to pass into the sensor 100 to react with the electrodes and electrolyte solution at a flowrate that does not cause undesirable sensor response characteristics, which can manifest as significant increased responses over an extended period such as minutes to hours depending upon the magnitude of the bulk flow gas volume that diffused through the capillary.

The inlet opening 140 may provide an opening into the central space within the housing. The resulting incoming oxygen may contact the electrolyte, for example, within the separator 120. In an embodiment, the exhaust opening 142 can be disposed adjacent to the counter electrode 111 and can serve to allow the oxygen generated at the counter electrode 111 to escape from the housing so that the oxygen does not accumulate within the housing and create false readings by flowing to the sensing electrode 115.

Within the electrochemical gas sensor 100, a separator 120 may be disposed between the body 102 and the cap 106. The separator 120 can comprise a porous member that acts as a wick for the retention and transport of the electrolyte between the reservoir and the electrodes. The separator can comprise a nonwoven porous material (e.g., a porous felt member), a woven porous material, a porous polymer (e.g., an open cell foam, a solid porous plastic, etc.), or the like, and is generally chemically inert with respect to the electrolyte and the materials forming the electrodes. In an embodiment, the separator 120 can be formed from various materials that are substantially chemically inert to the electrolyte including, but not limited to, glass (e.g., a glass mat), polymer (plastic discs), ceramics, or the like.

The electrolyte can comprise any aqueous electrolyte such as a solution of a salt, an acid, or a base depending on the target gas of interest. In an embodiment, the electrolyte can comprise a hygroscopic acid such as sulfuric acid for use in an oxygen sensor. Other target gases may use the same or different electrolyte compositions. In addition to aqueous based electrolytes, ion liquid electrolytes can also be used to detect certain gases. The electrolyte can be maintained within the sensor 100 to allow the reactions to occur at the sensing electrode 115 and the counter electrode 111. In an embodiment, the electrolyte can be a liquid that is maintained in the separator 120, which acts as an absorbent medium to retain the electrolyte in contact with the electrodes. In some embodiments, the electrolyte can be present in the form of a gel.

The electrodes 111, 113, 115 within the electrochemical gas sensor 100 can be electrically connected to an external circuit through one or more electrical connections. In an embodiment, the electrodes may have connector pins 112, 114 extending through the base 104 and/or the body 102 that can be electrically coupled, directly or indirectly, with the electrodes 111, 113, 115. While not shown in FIG. 1, the sensing electrode 115 can have a connector pin disposed through the base 104 to contact the sensing electrode 115. The external surfaces of the connector pins 112, 114 can be electrically coupled to an external circuit. The connector pins 112, 114 may sealingly engage the base 104 and/or the body 102 so that the connector pins 112, 114 are substantially sealed from the interior space 110 of the electrochemical gas sensor 100.

The connector pins 112, 114 can be formed from an electrically conductive material, which may be plated or coated. In an embodiment, the connector pins 112, 114 can be formed from brass, nickel, copper, or the like. The connector pins 112, 114 can be coated to reduce degradation due to the contact with the electrolyte. For example, the connector pins 112, 114 can include a coating of precious metal such as gold, platinum, silver, or the like, or other base metals such as tin.

The external circuitry can be used to detect a current between the sensing electrode 115 and the counter electrode 111 to determine the oxygen concentration in an ambient gas in contact with the sensor 100. A potentiostatic circuit can be used to maintain the potential of the sensing electrode 115 at a predetermined value relative to the reference electrode 113 independently from the counter electrode, whose potential remains uncontrolled and limited only by the electrocatalytic properties of the electrode. In an embodiment, the potential of the sensing electrode 115 relative to the reference electrode 113 can be set at a value of between about −300 and −800 mV for the oxygen sensor 100. In some embodiments, the sensing electrode 115 and the reference electrode 113 may comprise platinum when the potential of the sensing electrode 115 relative to the reference electrode 113 is set at a value of between about −300 and −800 mV for the oxygen sensor 100.

The electrodes generally allow for various reactions to take place to allow a current or potential to develop in response to the presence of a target gas such as oxygen. The resulting signal may then allow for the concentration of the target gas to be determined. The electrodes can comprise a reactive material suitable for carrying out a desired reaction. For example, the electrodes can be formed of a mixture of electrically conductive catalyst particles in a binder such as polytetrafluoroethylene (PTFE). For an oxygen sensor, the electrode can comprise carbon (e.g., graphite) and/or one or more metals or metal oxides such as copper, silver, gold, nickel, palladium, platinum, ruthenium, iridium and/or oxides of these metals. The catalyst used can be a pure metal powder, a metal powder combined with carbon, a metal powder supported on electrically conductive medium such as carbon, or a combination of two or more metal powders either as a blend or as an alloy. The materials used for the individual electrodes can be the same or different.

The electrode can also comprise a backing material or substrate such as a membrane to support the catalyst mixture. The backing material or substrate can comprise a porous material to provide gas access to the electrode through the substrate. The backing material may also be hydrophobic to prevent the electrolyte from escaping from the housing.

The electrodes can be made by mixing the desired catalyst with a hydrophobic binder such as a PTFE emulsion and depositing the mixture on the backing material. The electrodes might be deposited onto the substrate by for example screen printing, filtering in selected areas from a suspension placed onto the substrate, by spray coating, or any other method suitable for producing a patterned deposition of solid material. Deposition might be of a single material or of more than one material sequentially in layers, so as for example to vary the properties of the electrode material through its thickness or to add a second layer of increased electrical conductivity above or below the layer which is the main site of gas reaction.

The oxygen concentration at the sensing electrode 115 results from both the oxygen diffusing to the sensing electrode 115 through the separator 120 as well as oxygen entering the separator 120 as a result of a gas/separator 120 interface at any point along the separator 120. When the gas can contact the electrolyte in the separator 120 adjacent to the sensing electrode, a substantial portion of the oxygen contacting the sensing electrode 115 can result from the contact between the gas and the electrolyte in the separator 120 adjacent to the sensing electrode 115. This can result in a localized oxygen concentration in the electrolyte that exceeds the saturation concentration or solubility at certain temperatures. A temperature rise could then result in higher rate of gaseous oxygen diffusion to the active catalyst of the sensing electrode, as a direct result of gas evolution from the electrolyte and subsequent contact with the sensing electrode to create a transient "spike" in the output current.

In order to avoid the potential for spiking, the oxygen concentration at or near the sensing electrode 115 can be controlled to a level less than the threshold oxygen solubility at the operational temperature. In general, the dissolved oxygen concentration in the electrolyte at or near (e.g., within several millimeters) the sensing electrode 115 should be as close to zero as possible, thereby ensuring that the majority of the measured sensor response results from the controlled diffusion rate of gaseous oxygen through the capillary gas entry hole, rather than the less controlled, internal diffusion rate of dissolved oxygen through the separator. Limiting or preventing the internal diffusion rate of oxygen can improve the correlation between the sensor response and the gaseous oxygen concentration of the external environment. Ideally, the rate at which the oxygen reaches the sensing electrode 115 from the environment in which the oxygen is to be detected should be equal or close to the consumption rate of the oxygen at the sensing electrode 115. Typically, for most embodiments of this sensor type, the consumption rate of oxygen at the sensing electrode (e.g., the reduction rate) may be greater than the diffusion rate of gaseous oxygen to the sensing electrode 115 from the environment in which the oxygen is to be detected. When additional internal diffusion of dissolved and/or gaseous oxygen occurs from the electrolyte near the sensing electrode, the current generated in the circuit may correlate poorly with the external oxygen gas concentration.

In an embodiment, the threshold may be a saturation concentration at a design temperature. For example, the threshold may be the oxygen saturation concentration in the electrolyte at the upper operating temperature specified for the sensor 100. In some embodiments, the threshold may be a percentage of the saturation concentration at a specified temperature. This may allow for a safety factor to be included in the design of the oxygen sensor. For example, the oxygen concentration may be controlled to less than about 90%, less than about 80%, or less than about 70% of the saturation concentration at a specified temperature.

The oxygen concentration can be controlled in a number of ways including providing a spacing between the counter electrode 111 and the sensing electrode 115, limiting a gas/electrolyte contact at or near the sensing electrode 115, and/or selecting a geometry for the separator 120 retaining the electrolyte to limit the flux of oxygen to the sensing electrode 115 to a rate that is less than a consumption rate of oxygen at the sensing electrode 115 (e.g., an oxygen reduction rate at the sensing electrode 115).

A dissolved oxygen concentration gradient can be established in response to the operation of the oxygen sensor between the counter electrode 111 and the sensing electrode 115 under normal operational conditions. The dissolved oxygen concentration gradient may generally be expected to represent a concentration either at, or approaching, the solubility limit of dissolved oxygen in the electrolyte surrounding the counter electrode 111 and either low, or approximately zero, concentration of dissolved oxygen in the electrolyte around the sensing electrode 115 when the oxygen sensor 100 is used in typical operational environments. Since the oxygen concentration in the electrolyte decreases towards the sensing electrode 115, the creation of a suitable distance between the counter electrode and the sensing electrode 115 can be used to limit the concentration of dissolved oxygen in the electrolyte near the sensing electrode 115 to less than the threshold.

In an embodiment, the separation distance can be provided by forming an ionically conductive pathway between the electrodes having a desired length. The sensing electrode 115, the reference electrode 113, and the counter electrode 111 can be disposed on the ionically conductive pathway, with a distance separating each electrode. In an embodiment, the ionically conductive pathway can extend in any direction within the housing in order to achieve a desired spacing. The resulting separation may include a labyrinthian configuration so that the ionically conductive pathway is not in a straight line, which would result in an oxygen sensor having relatively large dimensions.

In an embodiment as shown in FIG. 2, the separator 120 can comprise a planar configuration, and each of the electrodes 111, 113, 115 can be disposed in a planar configuration in contact with the electrolyte retained in the separator 120. As shown, the separator 120 may form an ionically conductive pathway, hereafter referred to as a "conductive pathway," by virtue of the electrolyte being retained in the separator 120. The separator 120 can extend in a plane within the housing between the counter electrode 111, the reference electrode 113, and the sensing electrode 115. In this embodiment, each of the electrodes 111, 113, 115 may be disposed in a substantially planar arrangement to contact the electrolyte in the planar separator 120. The conduction pathway may not extend in a straight line within the housing, which may allow the conduction pathway to attain the desired length or separation between the electrodes while maintaining a compact sensor design. While the conduction pathway does not extend in a straight line, a single conduction pathway is formed in which the sensors are arranged in series on the pathway. For example, the middle electrode is disposed between the two end electrodes, and a shorter path is not present between the end electrodes than between either of the end electrodes and the middle electrode.

In an embodiment as shown in FIG. 2, the sensing electrode 115 and the counter electrode 111 can be disposed at the ends of the conduction pathway, and the reference electrode 113 can be disposed between the sensing electrode 115 and the counter electrode 111. This configuration locates the reference electrode 113 at a position where it is subject to relatively steady concentration gradients of dissolved oxygen and ions diffusing through the electrolyte, which may reduce the current variations generated by the potentiostatic driver circuitry that manifest as measurement "noise". The steady concentration gradients across the reference electrode in this configuration may be considered a more robust design solution for producing a stable reference potential than the highly variable and fluctuating concentrations of protons and dissolved oxygen that might be generated across the reference electrode 113 when it is positioned outside of the potential gradient, which can result in increased noise in the circuit.

The distance between the electrodes 111, 113, 115 on the conduction pathway may affect the potential for spiking to occur. In an embodiment, the distance along the conduction pathway (e.g., along a centerline of the conduction pathway) between the counter electrode 111 and the reference electrode 113 may be between about 1 mm and about 20 mm or between about 2 mm and about 15 mm, where the reference electrode 113 is disposed between the counter electrode 111 and the sensing electrode 115. In some embodiments, the distance (e.g., along a centerline of the conduction pathway) between the sensing electrode 115 and the counter electrode 111 may be between about 5 mm and about 30 mm, or between about 7.5 mm and about 25 mm. The relative ratio between the electrodes 111, 113, 115 may also affect the oxygen concentration gradient. In an embodiment, a ratio of a distance between the counter electrode 111 and the reference electrode 113 to a distance between the counter electrode 111 and the sensing electrode 115 can be between about 1:1 and about 1:10, or between about 1:1.5 and about 1:5.

In some embodiments, a diffusion barrier may be provided within the sensor to prevent the cross-diffusion of oxygen to the sensing electrode 115. This configuration may allow the conduction pathway to place the sensing electrode 115 relatively close to the counter electrode 111 without any oxygen generated at the counter electrode 111 reaching the sensing electrode 115. The use of a diffusion barrier may also allow the separator 120 to be positioned within a compact sensor while providing the separation needed to control the spiking type errors.

As shown in FIG. 2, the diffusion barrier can be formed around the sensing electrode 115 while the reference electrode 113 and the counter electrode 111 are disposed outside of the area defined by the diffusion barrier. The diffusion barrier can comprise a seal formed between the cap 106 and the body 102. In an embodiment, the seal can comprise a shoulder 202 formed on the body 102 and/or the cap 106, with a corresponding recess 204 or mating structure on the other component. A compliant material may be disposed on the shoulder 202 and/or the recess 204 to form a seal between the body 102 and the cap 106. The shoulder 202 can be formed from the same material as the body 102 and/or the cap 106, and may comprise an integral structure with the body 102 or the cap 106. The compliant seal, when present, may comprise any impermeable materials that is inert with respect to the electrolyte and has a sufficiently low oxygen permeation rate to ensure a low dissolved oxygen concentration is maintained in the electrolyte.

When the cap 106 and the body 102 are enclosed, the shoulder 202 may contact the recess 204, and any compliant seal may be positioned therebetween so that a seal is formed in the area around the sensing electrode 115. In some embodiments, a joining process (e.g., ultrasonic welding, etc.) can be used to fuse the two components to enhance the seal between the body 102 and the cap 106. A similar barrier may be formed around the perimeter of the body 102 and the cap 106 as part of the manufacturing process for the sensor to seal the housing and prevent the electrolyte from leaking.

In some embodiments, a small gap may exist between the shoulder 202 and the recess 204, or at an edge of the joint between the shoulder 202 and the recess 204. When the material of the shoulder 202 and the recess 204 are hydrophilic, a small amount of the electrolyte may be retained in the gap due to capillary action, resulting a layer of the electrolyte being maintained at the seal between the cap 106 and the body 102. The relatively small gap size along with the electrolyte disposed in the gap may form a diffusion barrier that has a greater diffusional resistance than the separator 120, thereby effectively limiting the diffusion of any oxygen through the chamber edge as compared to the diffusional path through the separator 120.

When the body 102 and the cap 106 are engaged, a chamber 206 can be formed by an inner surface of the body 102, an inner surface of the cap 106, and the inner surface of the shoulder 202. The edge seal may also define a surface of the chamber 206. The chamber 206 may have an opening 208 through which the separator 120 retaining the electrolyte can extend. Within the chamber 206, the separator 120 may be positioned to maintain contact between the electrolyte and the sensing electrode 115. The separator 120 retaining the electrolyte may substantially fill the opening 208 so that any gas within the sensor 100 is substantially prevented from entering the chamber 206 through a convective flow.

When the separator 120 substantially fills the opening 208, the oxygen reaching sensing electrode 115 may originate from oxygen diffusing through the electrolyte retained in the separator 120 from outside of the chamber 206, for example, as resulting from a gas/electrolyte interface outside of the chamber 206. The distance between the opening 208 and the sensing electrode 115 may be small compared to the conduction pathway length between the counter electrode 111 and the sensing electrode 115. In an embodiment, the portion of the separator 120 contained within the chamber 206 may be configured to provide an oxygen concentration within the electrolyte within the separator 120 corresponding to less than about a 1%, less than about a 0.8%, less than about a 0.6%, less than about a 0.4%, less than about a 0.2%, or less than about a 0.1% oxygen concentration at the sensing electrode 115. In an embodiment, the distance between the opening 208 and the sensing electrode 115 may be between about 0.1 mm and about 4 mm, or between about 0.5 mm and about 1.5 mm. A similar distance may be provided around the sensing electrode 115 within the chamber in the event that any oxygen is able to enter the chamber 206 through the seal.

The positioning of the sensing electrode 115 within the chamber 206 may limit the area of the gas/electrolyte interface and reduce or prevent a gas/electrolyte interface within the chamber 206, which can limit the potential for creating a high oxygen concentration at or near the sensing electrode 115. Rather, any oxygen diffusing to the sensing electrode 115 must diffuse through the electrolyte in the separator 120 over a short distance between the exterior of the chamber 206 and the sensing electrode 115 within the chamber 206. The resulting zone of decreased oxygen concentration within the electrolyte may help limit the potential for the oxygen concentration to exceed a saturation concentration in the electrolyte within the chamber 206. Any gas evolving due to a temperature rise may then be prevented from reaching the sensing electrode 115 except through the electrolyte in the separator 120.

In any of the embodiments described herein, the geometry of the separator 120 may affect the flux of oxygen to the sensing electrode 115 through the electrolyte in the separator 120, and the geometry can be selected so that the rate of oxygen diffusion to the sensing electrode 115 is less than a consumption rate of oxygen at the sensing electrode 115 (e.g., an oxygen reduction rate at the sensing electrode 115). The thickness of the separator 120 (e.g., a distance perpendicular to the plane of the separator 120) near the chamber 206 may be determined by the available distance between the cap 106 and the body 102 when the sensor is assembled. In an embodiments, the separator 120 may contact both the cap 106 and the body 102. In some embodiments, the thickness of the separator 120 may be between about 0.5 mm and about 5 mm. The width of the separator 120 at the opening 208 may be based on a total area available for the diffusion of oxygen into the chamber 206 through the electrolyte retained in the pores of the separator 120. In general, the area for diffusion (e.g., the product of the width times the thickness along with the porosity of the separator 120) may affect the total amount of oxygen diffusing into the chamber 206 through the electrolyte to contact the sensing electrode 115. In some embodiments, the width of the separator 120 at the opening 208 may be between about 0.5 mm and about 20 mm, between about 5 mm and about 17 mm, or between about 6 mm and about 15 mm. The selection of the material for the separator 120, the selection of the electrolyte and electrolyte concentration, and/or the desired oxygen detection range can affect the selection of the available area of the separator 120 at the opening 208.

In use, the sensor 100 can detect an oxygen concentration of a gas in the environment in which the sensor 100 is disposed. Referring to FIG. 1 and FIG. 2, the gas in the environment around the sensor 100 can enter the housing through an opening 140 so that the oxygen can be received within the housing. As described herein, the housing can comprise the counter electrode 111, the reference electrode 113, and the sensing electrode 115. The oxygen can contact the separator 120 retaining the electrolyte. The separator 120 with the electrolyte retained therein forms the ionically conductive pathway between each of the electrodes 111, 113, 115, which can be disposed in a planar alignment. A potentiostatic circuit can be used to maintain a potential of the sensing electrode 115 lower than the reference electrode 113, and as a result, the oxygen may begin to be reduced at the sensing electrode 115 while water is oxidized at the counter electrode 111. The oxygen can thus be consumed at the sensing electrode 115 and regenerated at the counter electrode 111. The oxygen generated at the counter electrode 111 can pass through a diffusional barrier and pass out of the sensor through an outlet 142. An oxygen concentration gradient can then be formed in the electrolyte in the separator 120 between the counter electrode 111 and the sensing electrode 115. A current can be developed based on the reaction of the oxygen and water at the sensing electrode 115 and the counter electrode 111, which may allow the oxygen concentration in the gas contacting the separator 120 to be determined.

During the detection process, the oxygen concentration in the electrolyte at or near the sensing electrode 115 can be limited to less than a threshold amount. In general, the oxygen concentration in the electrolyte in the separator 120 can be limited to less than a saturation concentration at a predetermined temperature, and in some embodiments, the oxygen concentration in the electrolyte in the separator 120 can be limited to less than a percentage of a saturation concentration at a predetermined temperature. In an embodiment the length of the separator 120 and the distance between the counter electrode 111 and the sensing electrode 115 can be selected so that the oxygen concentration along the oxygen concentration gradient is below the threshold at or near the sensing electrode 115. For example, the oxygen concentration along the oxygen gradient may be below the saturation concentration in the electrolyte at a predetermined temperature, or below a percentage of a saturation concentration at the predetermined temperature, within about 0.5 mm, within about 1 mm, within about 2 mm, within about 4 mm, or within about 5 mm of the sensing electrode.

In some embodiments, the sensing electrode 115 can be disposed within the chamber 206 formed within the housing. The separator 120 can extend into the chamber 206 to provide contact between the electrolyte in the separator 120 and the sensing electrode 115. The separator 120 can be positioned within the chamber 206 and the opening 208 to prevent or limit any gas/electrolyte contact within chamber 206. In some embodiments, some amount of gas/electrolyte contact may occur within the chamber 206, but the gas may not be able to be exchanged with a gas outside of the chamber 206, thereby limiting the potential for the formation of a high-oxygen concentration gas contacting the electrolyte in the separator 120 near to the sensing electrode 115. The use of the chamber 206 may limit the rate at which the oxygen can diffuse to the sensing electrode 115 during the detection process and thereby limit the oxygen concentration along the oxygen gradient near the sensing electrode 115 to less than the threshold amount.

In some embodiments, limiting the oxygen concentration in the electrolyte can include limiting the diffusional flux of oxygen through the electrolyte in the separator 120 to less than a rate of oxygen reduction at the sensing electrode 115. The choice of the geometry of the separator 120, the geometry of the chamber 206, and/or the relative positioning of the electrodes may all be used to limit the diffusion of oxygen in the electrolyte to the sensing electrode 115.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An oxygen sensor comprising:
    a housing defining an interior space;
    a sensing electrode;
    a reference electrode;
    a counter electrode, wherein the sensing electrode, the reference electrode and the counter electrode are disposed in a planar arrangement and wherein the reference electrode is disposed between the sensing electrode and the counter electrode;
    a separator retaining an electrolyte, wherein the electrolyte provides an ionically conductive pathway between each of the sensing electrode, the reference electrode, and the counter electrode within the housing, wherein a shortest path between the sensing electrode and the counter electrode on the ionically conductive pathway exists through the reference electrode; and
    a chamber within the housing, wherein the chamber contains the sensing electrode, wherein the chamber comprises an opening, and wherein the separator extends into the chamber and substantially fills the opening so that the rate of oxygen diffusion to the sensing electrode is less than a consumption rate of oxygen at the sensing electrode, wherein the reference electrode and the counter electrode are outside of the chamber.

2. The oxygen sensor of claim 1, wherein the housing comprises a cap coupled to a body, wherein the chamber is formed by an inner surface of the cap, an inner surface of the body, and a seal disposed between the cap and the body around the sensing electrode.

3. The oxygen sensor of claim 2, wherein a layer of the electrolyte is maintained at the seal between the cap and the body.

4. The oxygen sensor of claim 1, wherein the sensing electrode, the reference electrode, and the counter electrode are coupled through an external circuit, wherein the external circuit detects a current between the sensing electrode and the counter electrode to determine a concentration of oxygen in an ambient gas.

5. The oxygen sensor of claim 1, wherein a portion of the separator is contained within the chamber, and where a length of a portion of the electrolyte in the separator within the chamber is configured to provide an oxygen concentration at the sensing electrode in a range between zero and 1%.

6. The oxygen sensor of claim 1, wherein a ratio of a distance between the counter electrode and the reference electrode on the ionically conductive pathway to a distance between the counter electrode and the sensing electrode on the ionically conductive pathway is between about 1:1 to about 1:10.

7. The oxygen sensor of claim 1, wherein a distance between the counter electrode and the reference electrode on the ionically conductive pathway is between about 1 mm to about 20 mm, and wherein a distance between the sensing electrode and the counter electrode on the ionically conductive pathway is between about 5 mm to about 30 mm.

8. The oxygen sensor of claim 1, wherein a length and cross-section area of the separator are configured to provide a lower diffusional flowrate of oxygen through the electrolyte to the sensing electrode than a reduction rate of oxygen at the sensing electrode.

9. The oxygen sensor of claim 1, wherein the separator extends into the chamber into contact with the sensing electrode, and wherein the separator substantially fills the opening into the chamber so that the rate of oxygen diffusion to the sensing electrode is less than a consumption rate of oxygen at the sensing electrode.

10. An oxygen sensor comprising:
    a housing defining an interior space;
    a sensing electrode;
    a reference electrode;
    a counter electrode, wherein the sensing electrode, the reference electrode and the counter electrode are disposed in a planar arrangement and wherein the reference electrode is disposed between the sensing electrode and the counter electrode;
    a separator retaining an electrolyte, wherein the electrolyte provides an ionically conductive pathway between each of the sensing electrode, the reference electrode, and the counter electrode within the housing, wherein a shortest path between the sensing electrode and the counter electrode on the ionically conductive pathway exists through the reference electrode; and
    a chamber within the housing, wherein the chamber contains the sensing electrode, wherein the chamber comprises an opening, and wherein the separator extends into the chamber and substantially fills the opening so that the rate of oxygen diffusion to the sensing electrode is less than a consumption rate of oxygen at the sensing electrode, wherein the opening and the separator are configured to prevent gas from entering the chamber.

* * * * *